(12) United States Patent  (10) Patent No.: US 12,428,235 B2
Bogle                      (45) Date of Patent: Sep. 30, 2025

(54) CONVEYOR BELT EDGE MODULE

(71) Applicant: Laitram, L.L.C., Harahan, LA (US)

(72) Inventor: David W. Bogle, Franklinton, LA (US)

(73) Assignee: Laitram, L.L.C., Harahan, LA (US)

( * ) Notice: Subject to any disclaimer, the term of this patent is extended or adjusted under 35 U.S.C. 154(b) by 76 days.

(21) Appl. No.: 18/291,290

(22) PCT Filed: Jul. 1, 2022

(86) PCT No.: PCT/US2022/035908
§ 371 (c)(1),
(2) Date: Jan. 23, 2024

(87) PCT Pub. No.: WO2023/014453
PCT Pub. Date: Feb. 9, 2023

(65) Prior Publication Data
US 2024/0359924 A1    Oct. 31, 2024

Related U.S. Application Data

(60) Provisional application No. 63/229,092, filed on Aug. 4, 2021.

(51) Int. Cl.
*B65G 17/40* (2006.01)
*B65G 17/08* (2006.01)
*B65G 17/10* (2006.01)

(52) U.S. Cl.
CPC .......... *B65G 17/40* (2013.01); *B65G 17/08* (2013.01); *B65G 17/10* (2013.01)

(58) Field of Classification Search
CPC ........ B65G 17/40; B65G 17/08; B65G 17/10; B65G 17/38

USPC ......................................................... 198/853
See application file for complete search history.

(56) References Cited

U.S. PATENT DOCUMENTS

| 4,821,872 | A |   | 4/1989  | Lapeyre |
| 4,832,183 | A |   | 5/1989  | Lapeyre |
| 4,901,844 | A |   | 2/1990  | Palmaer et al. |
| 4,972,942 | A |   | 11/1990 | Faulkner |
| 5,217,110 | A |   | 6/1993  | Spangler et al. |
| 5,435,435 | A | * | 7/1995  | Chiba .................... B65G 17/08 198/853 |
| 5,899,322 | A |   | 5/1999  | Gamble, Jr. |
| 5,904,241 | A | * | 5/1999  | Verdigets ............... B65G 17/08 198/853 |
| 6,499,587 | B1 |  | 12/2002 | Greve |
| 6,766,901 | B2 |  | 7/2004  | Guldenfels et al. |

(Continued)

*Primary Examiner* — Mark A Deuble
(74) *Attorney, Agent, or Firm* — James T. Cronvich

(57) ABSTRACT

An edge module for a modular conveyor belt. The edge module includes a rod-retention plug that is pivotably mounted in a socket that opens onto the module's bottom. The plug has a bore that receives an axle in the socket on which the plug can be rotated. An arm attached to a main body of the plug by a living hinge allows the arm to flex from a relaxed state occluding a hinge-rod passageway at the belt's hinge joints to a flexed state allowing a hinge rod to be inserted into or removed from the passageway. Locking structure on the plug and in the socket engage to lock the plug in place. A sideguard mounted in the edge module is locked in place by locking structure in the edge module. Locking structure on both the sideguard and the plug engage to lock the sideguard and the plug in place.

20 Claims, 6 Drawing Sheets

(56) References Cited

U.S. PATENT DOCUMENTS

| | | | | |
|---|---|---|---|---|
| 6,811,021 B1 * | 11/2004 | Corley | ............... | B65G 17/30 |
| | | | | 198/853 |
| 6,814,223 B1 * | 11/2004 | Verdigets | ............ | B65G 17/08 |
| | | | | 198/853 |
| 6,827,204 B2 | 12/2004 | Cribiu | | |
| 6,840,371 B2 | 1/2005 | Hansen et al. | | |
| 6,857,516 B1 | 2/2005 | Verdigets | | |
| 7,699,160 B2 * | 4/2010 | Marsetti | ............. | B65G 17/40 |
| | | | | 198/853 |
| 8,371,436 B2 | 2/2013 | Cornelissen | | |
| 9,334,121 B2 * | 5/2016 | Bogle | ............... | B65G 33/02 |
| 9,550,628 B2 | 1/2017 | Wunsch | | |
| 10,155,625 B1 | 12/2018 | Bogle et al. | | |
| 12,162,690 B2 * | 12/2024 | Bogle | ............... | B65G 17/38 |
| 2010/0258410 A1 | 10/2010 | Wunsch | | |
| 2018/0362256 A1 | 12/2018 | Bogle et al. | | |
| 2020/0216269 A1 | 7/2020 | Dale | | |

* cited by examiner

CONVEYOR BELT EDGE MODULE

BACKGROUND

The invention relates generally to power-driven conveyers and in particular to edge modules of modular articulating conveyor belts.

Modular conveyor belts are constructed of a series of rows of belt modules joined end to end at hinge joints by hinge rods inserted in lateral passageways formed by the interleaved hinge eyes of adjacent belt rows. Edge modules at the side edges of the belt often include rod-retention structure to prevent the hinge rods from exiting the passageways as the belt runs. Usually the rod-retention structure is monolithically formed as part of the edge module and made of the same material. But a material that works well for retaining rods may not work so well as the main module material.

Some conveyor belts require sideguards to prevent conveyed products from falling off the side edges of the belt. Many sideguards are formed monolithically as part of edge modules. But sideguards of different heights or other constructions require different molds or after-molding machining.

SUMMARY

One version of a conveyor belt edge module embodying features of the invention comprises a module body extending in length from a first end to a second end, laterally in width from the first side edge to a second side edge, and in thickness from a top to a bottom. A first set of hinge elements has rod holes aligned along the first end, and a second set of hinge elements has rod holes aligned along the second end. A socket is formed in the module body laterally inward of the first side edge. A rod-retention plug is positioned in the socket to occlude the rod holes aligned along the first end of the module body. A sideguard standing up from the top of the module body at the first side edge has locking structure that engages the rod-retention plug to lock the rod-retention plug in position in the socket.

Another version of a conveyor belt edge module comprises a module body that extends in length from a first end to a second end, laterally in width from the first side edge to a second side edge, and in thickness from a top to a bottom. A first set of hinge elements has rod holes aligned along the first end, and a second set of hinge elements has rod holes aligned along the second end. A laterally elongated hinge element at the first end and the first side edge has a rod hole aligned with the rod holes of the first set of hinge elements. A socket opens onto the bottom of the module body and divides the rod hole of the laterally enlarged hinge element into an outer rod-hole portion that opens onto the first side edge and an inner rod-hole portion. An axle and socket locking structure reside in the socket. A rod-retention plug mounted in the socket has plug locking structure and an axial bore receiving the axle. The rod-retention plug is rotatable from an unlocked position in which the plug locking structure and the socket locking structure are disengaged to a locked position in which the plug locking structure and the socket locking structure are engaged.

A modular conveyor belt comprises a plurality of those conveyor belt edge modules arranged first end to second end with at least some of hinge elements of the first set interleaved with at least some of the second hinge elements of the second set to form laterally aligned passageways through the interleaved hinge elements. Hinge rods received in the laterally aligned passageways connect consecutive conveyor belt edge modules at hinge joints. The rod-retention plugs in the locked position occlude the aligned passageways to block the hinge rods from exiting the passageways through the conveyor belt edge modules while the modular conveyor belt is running.

DETAILED DESCRIPTION

Figure 1:
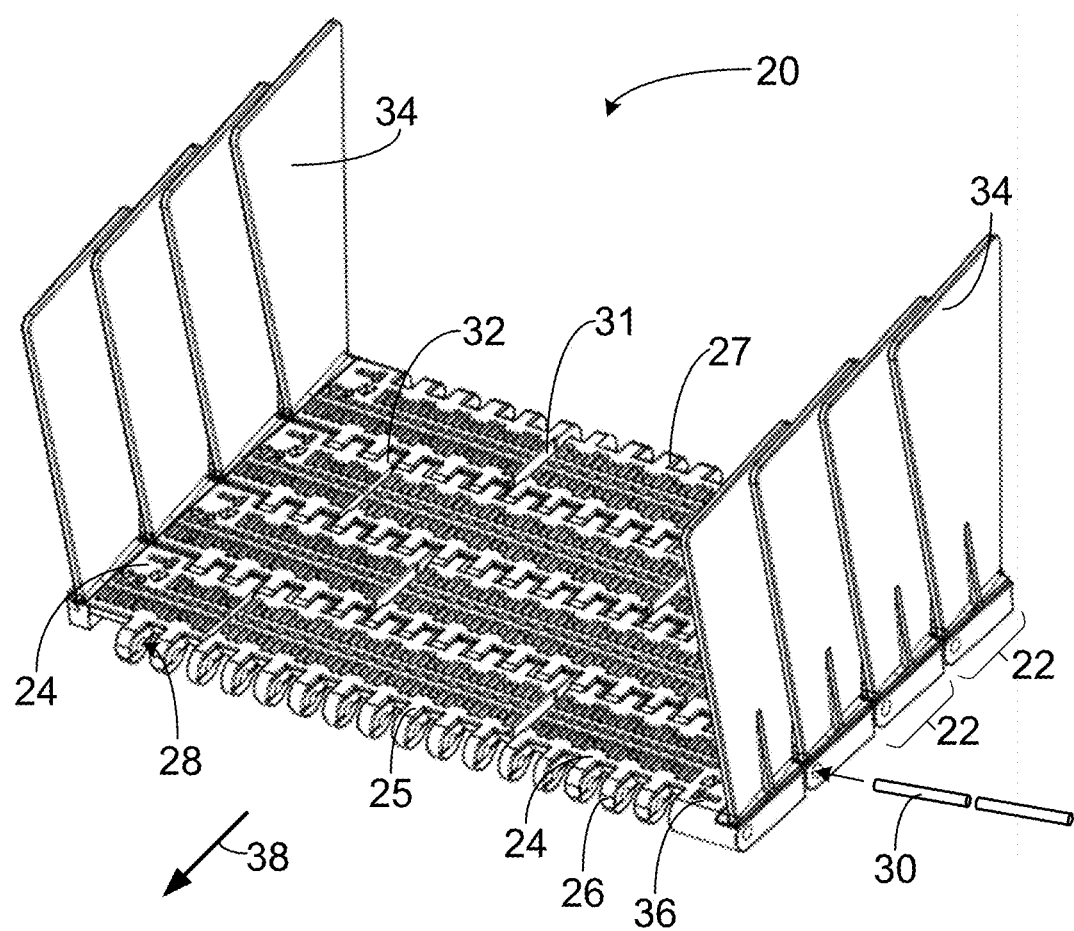
FIG. 1 is an isometric view of a portion of a modular conveyor belt embodying features of the invention.

A portion of a modular conveyor belt embodying features of the invention is shown in FIG. 1. The conveyor belt 20 is constructed of a series of rows 22 of one or more conveyor belt modules, such as interior modules 25 and edge modules 24 of different widths, arranged in a bricklay pattern with seams between side-by-side modules in each row to form an endless conveyor belt. The modules 24, 25 are molded of a thermoplastic material, such as polypropylene, polyethylene, acetal, and nylon. Hinge elements 26, 27 along first and second ends of the rows 22 are interleaved. Aligned rod holes 28 extend laterally through the hinge elements 26, 27 at each row end. The interleaved hinge elements 26, 27 of adjacent rows form a lateral passageway. A hinge rod 30 received in the passageway connects adjacent rows 22 together at a hinge joint 32. The hinge rods 30 may be made of plastic or of stainless steel for heavy loads or long belt lengths. Stainless steel or carbon steel links 31 linking consecutive hinge rods may be positioned in some or all of the seams to strengthen the belt by bearing some of the belt tension. Sideguards 34 stand up from the tops 36 of the edge modules 24 at both the left and right sides of the conveyor belt 20. The sideguards 34 are oriented oblique to a direction of belt travel 38 so that they can overlap without interference to confine conveyed articles to the top of the belt 20 as it runs along an upper carryway.

Figure 2:
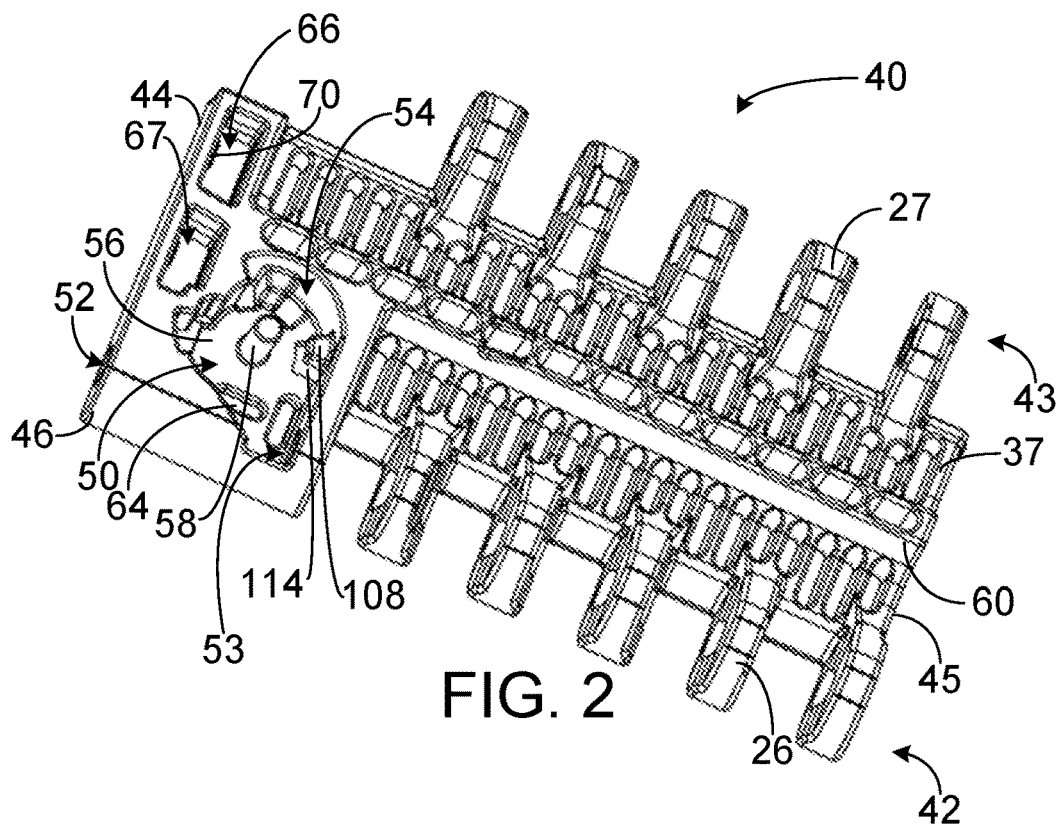
FIG. 2 is an isometric view of the bottom side of the body of an edge module for a conveyor belt as in FIG. 1.
Figure 3:
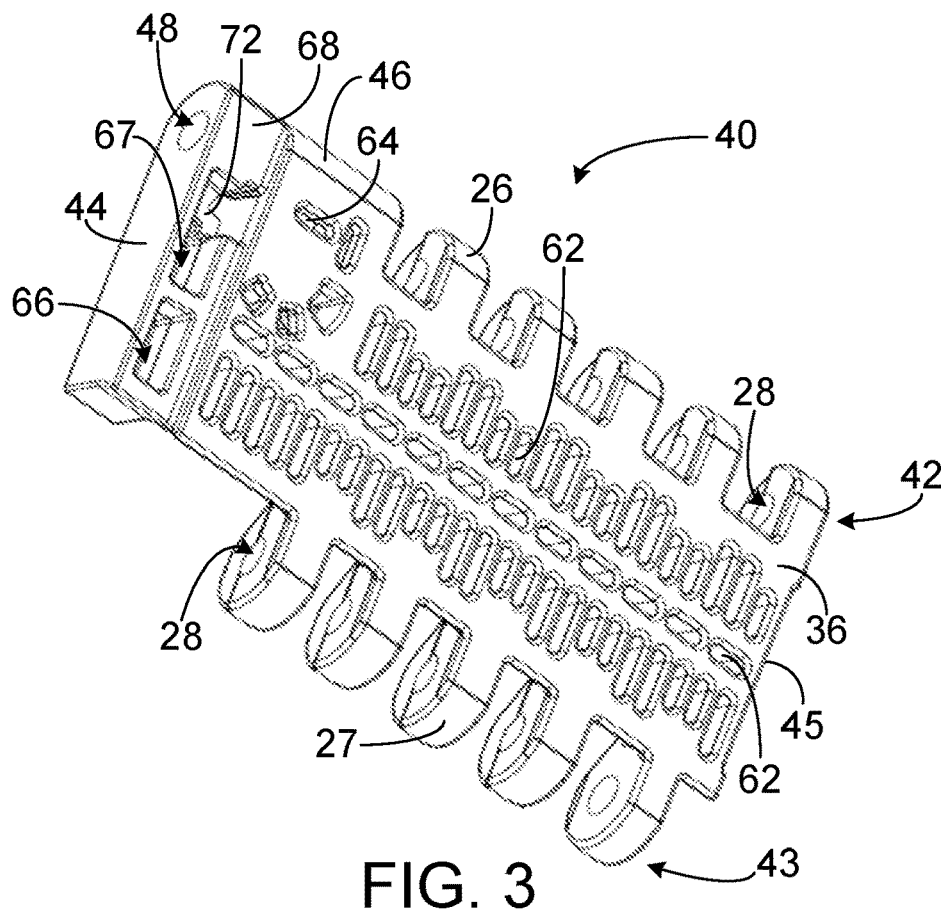
FIG. 3 is an isometric view of the top side of the body of the edge module of FIG. 2.

As shown in FIGS. 2 and 3, each edge module has a module body 40 that extends in length from a first end 42 to a second end 43, laterally in width from a first side edge 44 to a second side edge 45, and in thickness from a top 36 to a bottom 37. Hinge elements 26 of a first set are spaced apart across gaps along the first end 42, and those 27 of a second set are spaced apart along the second end 43. Rod holes 28 extending through the hinge elements 26, 27 are aligned along each end 42, 43. A laterally elongated hinge element 46 along the first end 42 at the first side edge 44 has a rod hole 48 aligned with the rod holes 28 of the hinge elements 26 along the first end 42. A socket 50 opening onto the bottom 37 of the module body 40 divides the rod hole 48 of the elongated hinge element 46 into an outer rod-hole portion 52 and an inner rod-hole portion 53 farther from the first side edge 44. The socket 50 is bounded by a peripheral wall 54 and a ceiling 56 that is the inner face of a thin web whose outer face is the top 36 of the module body 40. An axle 58 extends from the ceiling 56 through the socket 50 toward the socket's opening onto the bottom 37 of the module body 40.

A laterally extending drive bar 60 at the bottom 37 of the module body 40 is designed to be engaged by a drive sprocket or drum (not shown) to drive a conveyor belt as in FIG. 1. But other belt and drive structures could be used. Through holes 62 of different sizes and orientations extend through the module body 40 from the top 36 to the bottom 37. The through holes 62 allow air to flow through or liquid to drain from the module body 40. Other through holes 64 extend from the top 36 of the module body 40 and open into the socket 50 at the ceiling 56. But for applications that do not require air flow or drainage, module bodies without the through holes 62, 64 could be used.

First and second slots 66, 67 extend through the thickness of the module body 40 from the bottom 37 to a shelf 68 recessed below the top 36 at the first side edge 44. The slots 66, 67 each have a tab 70 on a side of the slots. An interior shelf 72 recessed below the shelf 68 bounds a portion of the second slot 67.

Figure 4:
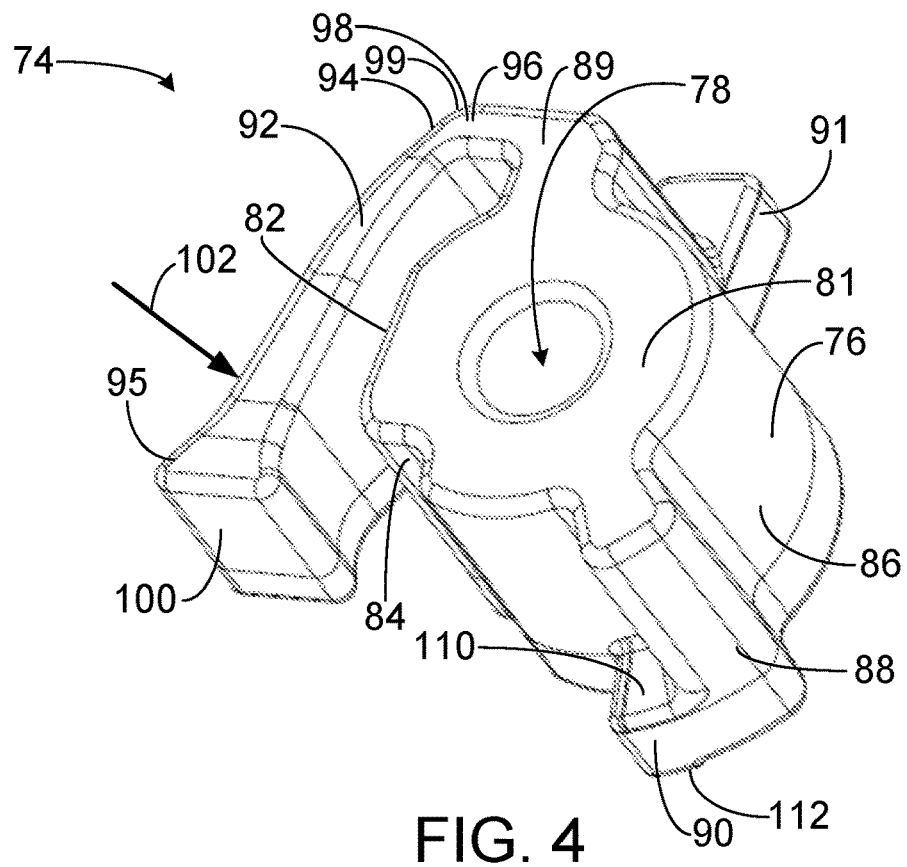
FIG. 4 is an enlarged isometric view of a rod-retention plug usable in a conveyor belt as in FIG. 1.
Figure 5:
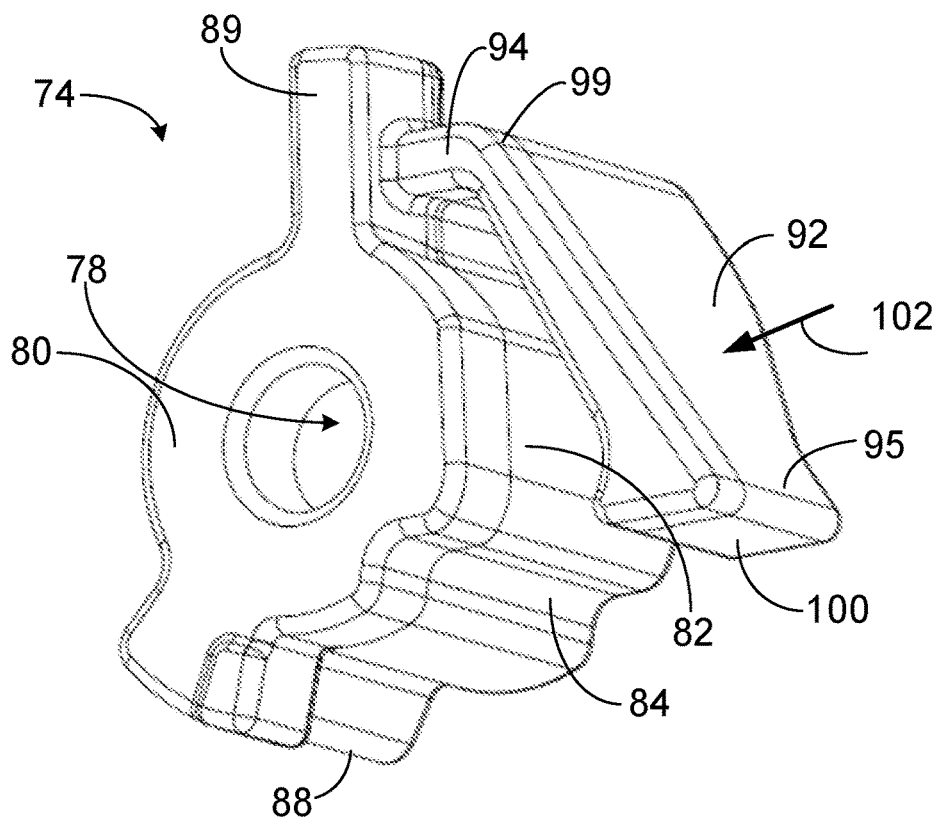
FIG. 5 is an enlarged isometric view of the rod-retention plug of FIG. 4 from a different perspective.

FIGS. 4 and 5 show a rod-retention plug 74 that mounts into the socket 50 of the module body of FIG. 2. The plug 74 has a main body 76 that has a generally circular cylindrical outer side 86. A central axial bore 78 extends through the plug's main body 76 from a top face 80 to a bottom face 81. An axially extending flat 82 and an axially extending groove 84 are formed on the outer side 86 of the main body 76. First and second axial ribs 88, 89 protrude from the outer side 86 and extend from the top face 80 to the bottom face 81. The flat 82, the groove 84, and the ribs 88, 89 are circumferentially spaced apart around the outer side 86 of the main body 76. A first stub 90 extends radially out from the outer side 86 of the main body 76 at the top face 80. A second stub 91 extends outward of the second rib 89 at the top face 80. An arm 92 having a fixed end 94 and an opposite free end 95 is attached to the second rib 89 by a living hinge 96. A thin shoulder 98 extends away from the second rib 89 through a bend 99 to the fixed end 94 of the arm 92. The thickness of the arm 92 increases from the fixed end 94 at the living hinge 96 to the free end 95, which terminates in an enlarged blunt blocking face 100. The shoulder 98, its bend 99, and the fixed end 94 of the arm 92 are thin enough to form the living hinge 96 that enables the arm to be flexed from its relaxed state to a flexed state closer to the flat 82 when a force is applied in the direction of the arrow 102.

Figure 6:
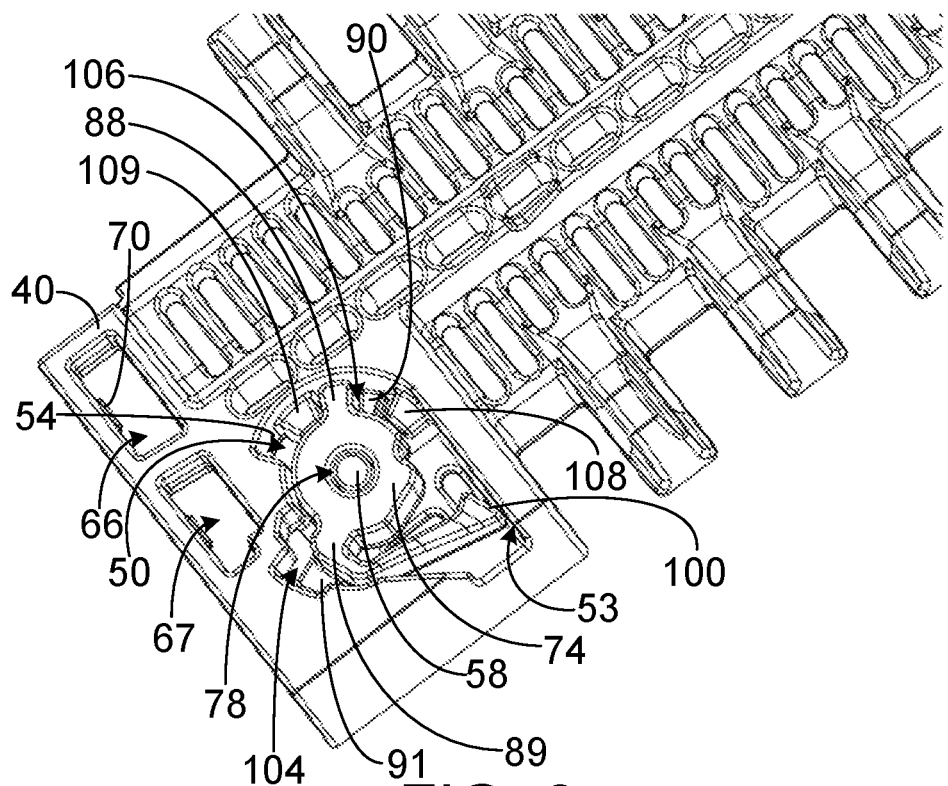
FIG. 6 is an isometric view of the bottom of the edge portion of the module body of FIG. 2 with the rod-retention plug of FIGS. 4 and 5 in an unlocked position.

FIG. 6 shows the position of the rod-retention plug 74 upon initial installation into the socket 50. The plug 74 is installed by aligning the bore 78 with the axle 58, the second rib 89 and stub 91 with a groove 104 in the socket wall, and the first rib 88 and stub 90 in a gap 106 between two socket stubs 108, 109 protruding into the interior of the socket 50 from its wall 54. The second socket stub 109 serves as a stop limiting the extent of counterclockwise rotation (in FIG. 6) of the plug 74 about the axle 58 by contact with the first rib 88. In the unlocked position of the plug in FIG. 6, the blocking face 100 at the free end of the arm 92 occludes only a minor portion of the inner rod-hole portion 53.

Figure 7:
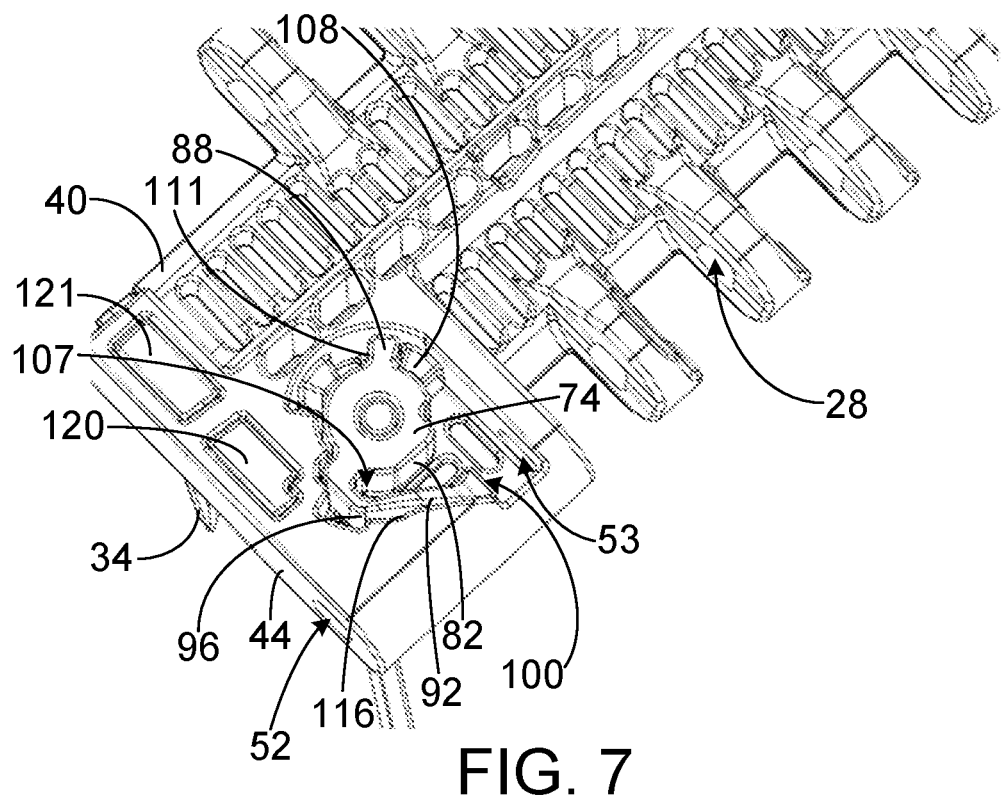
FIG. 7 is an isometric view as in FIG. 6 with a sideguard and the rod-retention plug in a locked position.

The rod-retention plug 74 is shown in the locked position in FIG. 7. The plug 74 is rotated clockwise from the unlocked position of FIG. 6 to the locked position of FIG. 7. An example of a handy tool for locking the plug 74 is a spanner wrench with two pins. One pin fits in a crook 107 of the arm, and the other fits against a side face 111 of the first rib 88. The spanner is then rotated clockwise to lock the plug 74 in the locked position. Axial compressive engagement between the bottom surface 110 (FIG. 4) of the first plug stub 90 and the top surface of the first socket stub 108 locks the plug 74. When the first plug stub 90 is wedged beneath the first socket stub 108, a nub 112 (FIG. 4) protruding from the top surface of the first plug stub clicks in place in a hole 114 (FIG. 2) through the top 36 of the module body 40 and into the socket 50. The hole 114 is axially aligned with the first socket stub 108, i.e., along a line parallel to the axis of the axle 58. The first plug stub 90 and its nub 112 are components of plug locking structure, and the first socket stub 108 and the hole 114 constitute socket locking structure. The plug 74 is locked by engaging the plug locking structure with the socket locking structure. When the plug is in the unlocked position of FIG. 6, the plug and socket locking structures are disengaged. In the locked position of the plug 74, the arm 92 resides close to an oblique portion 116 of the socket wall and occludes the outer rod-hole portion 52. And the blocking face 100 of the arm 92 occludes the majority of the inner rod-hole portion 53.

While a belt constructed of these modules is running, a hinge rod in the aligned rod holes 28 is blocked by the blocking face 100 from exiting the hinge joint. A lateral force against the blocking face 100 by the hinge rod pushes the arm 92 against the oblique wall portion 116 and prevents further outward movement of the rod. During assembly of a belt, a hinge rod is inserted into the aligned rod holes 28 of adjacent modules from the side edge 44 of the module body 40 through the outer rod-hole portion 52 and against the arm 92. The force of the hinge rod against the oblique arm 92 causes the arm to flex at the living hinge 96 toward the flat 82 on the plug 74. The hinge rod can then slide along the flexed arm 92 and into the inner rod-hole portion 53 and the aligned rod holes 28. Once the tail end of the hinge rod clears the arm 92, the arm snaps back to its relaxed, unflexed state close to the oblique wall portion 116. The flat 82 on the plug 74 limits the range of flexion of the arm 92 to prevent damaging the living hinge 96. The groove 84 (FIG. 5) in the plug 74 provides clearance for the enlarged blocking face 100 when the arm 92 is flexed fully against the flat 82. Because the rod-retention plug 74 and the module body 40 are separate pieces, they can be made of different materials. For example, the module body 40 can be molded out of a rigid plastic material, and the plug 74 can be molded out of a more flexible plastic material to allow the arm 92 to flex more easily.

The installation of the rod-retention plugs 74 into the sockets 50 is performed during belt or module assembly. And during assembly the plugs 74 are rotated from the unlocked position upon initial installation to the locked position for temporary storage or shipping.

Figure 8:
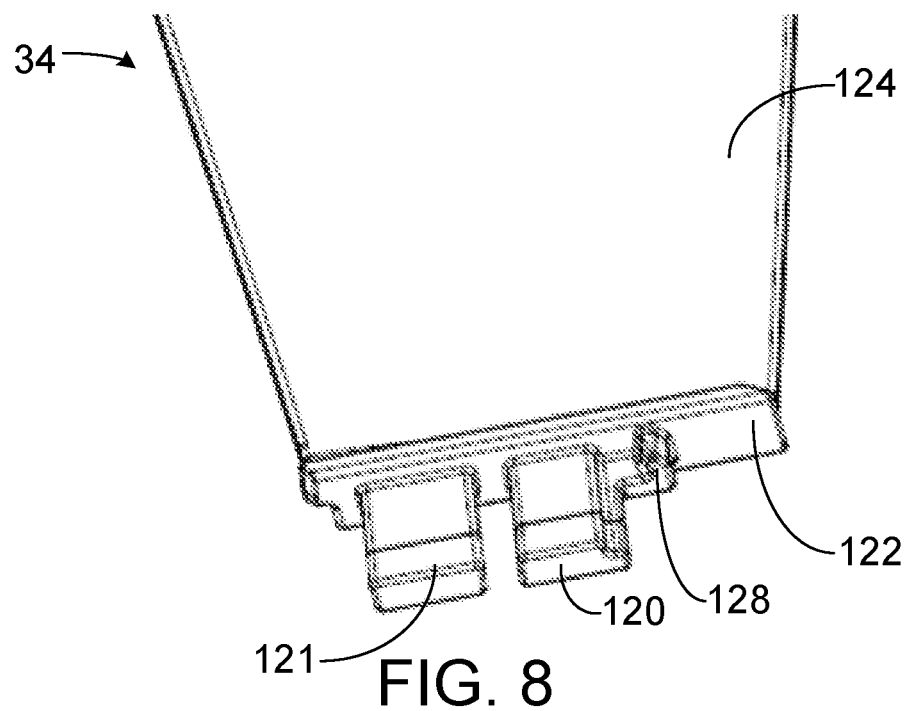
FIG. 8 is an isometric view of the lower portion of a sideguard as in FIG. 1 from the inner side.
Figure 9:
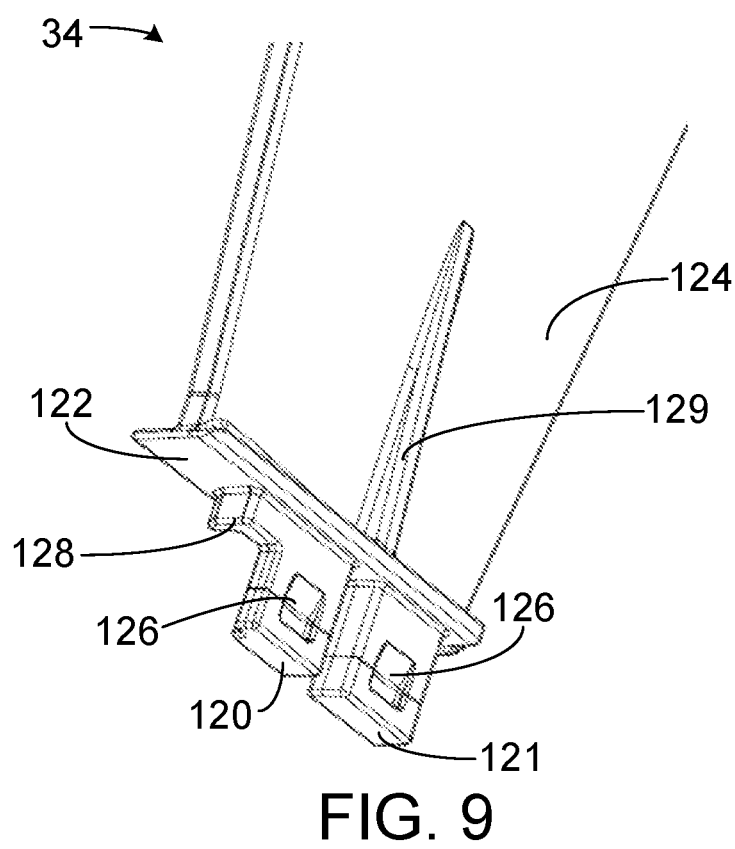
FIG. 9 is an isometric view of the lower portion of the sideguard of FIG. 8 from the outer side.

The conveyor belt 20 of FIG. 1 is shown with sideguards 34. As shown in FIGS. 8 and 9, the sideguards 34 have two legs 120, 121 extending down from a base 122. A sideguard plate 124 extends up from a base 122 opposite the legs 120, 121. The legs 120, 121 have tab recesses 126 that mate with the complementary tabs 70 (FIG. 6) in the slots 66, 67 (FIG. 6) to hold the sideguard 34 in place as in FIG. 7 in a snap fit. When the sideguard 34 is installed, its base 122 sits on the shelf 68 (FIG. 2) at the side edge 44 of the module body 40. The first leg 120 has a hook 128 that extends down from the base 122 at a side of the leg. The hook 128 rests on the interior shelf 72 (FIG. 3) when the sideguard 34 is in place. The hook 128 hooks around the second plug stub 91 (FIG. 4) to further lock the plug 74 in the locked position. And the second plug stub 91 helps lock the sideguard 34 in place. The second plug stub 91 is an additional component of the plug locking structure, and the hook 128 constitutes sideguard locking structure. A tapered stiffener 129 extends partway up the outer side of the sideguard plate 124 from the base 122 to bolster the sideguard 34.

Because the sideguard 34 and the module body 40 are separate pieces, they can be made of different materials that are chosen for the functions they perform. And as long as the base 122 and the legs 120, 121 of the sideguards 34 remain the same, plates of different heights or different designs can be used with the same module bodies 40. Furthermore, the attachable sideguards 34 can be shipped separately from the conveyor to reduce the sizes of the shipping cartons. The sideguards 34 can then be inserted in the edge modules when the belt is being installed on a conveyor.

Figure 10:
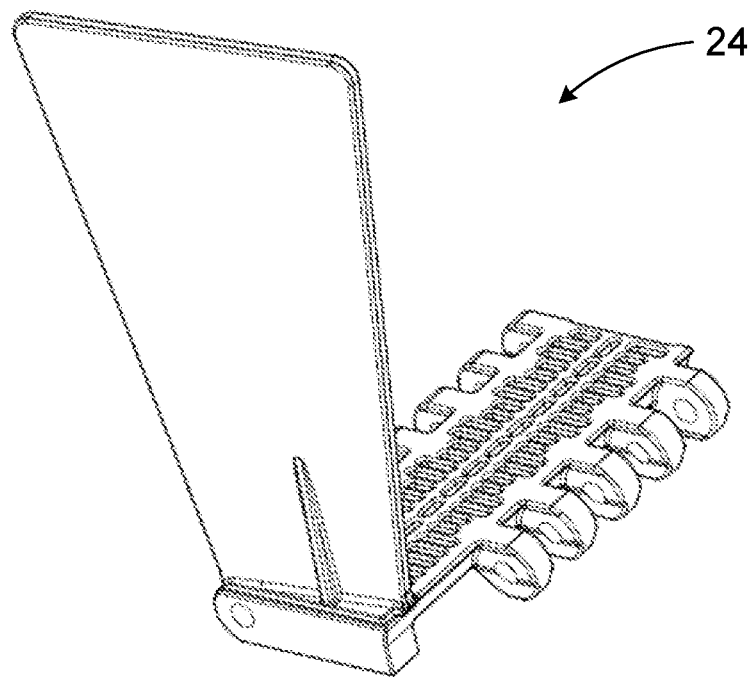
FIG. 10 is an isometric view of an edge module for the conveyor belt of FIG. 1 from a top perspective.
Figure 11:
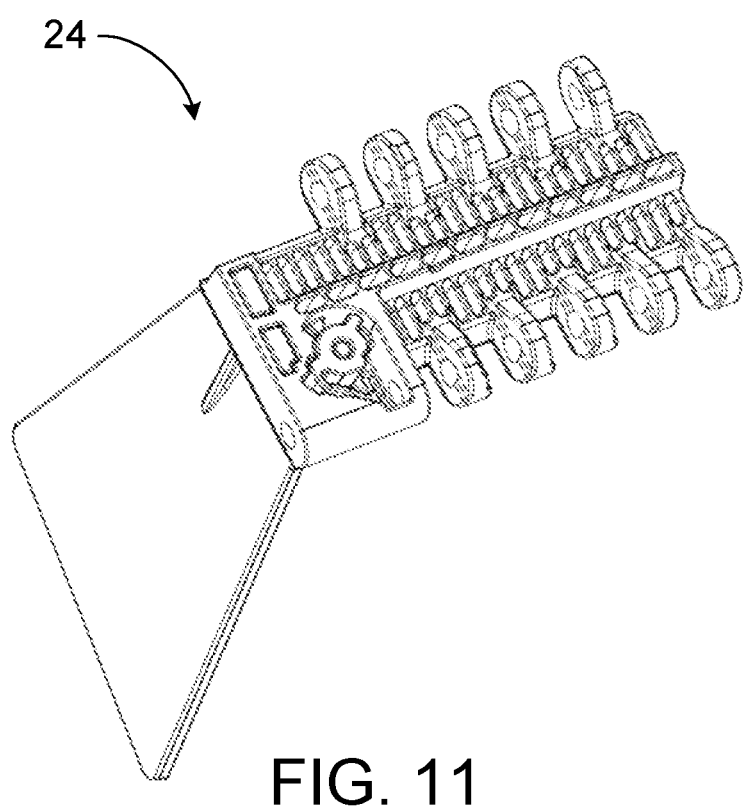
FIG. 11 is an isometric view of the edge module of FIG. 10 from a bottom perspective.

FIGS. 10 and 11 show the completed conveyor belt edge modules 24 with sideguards as in the conveyor belt 20 of FIG. 1.

What is claimed is:

1. A conveyor belt edge module comprising:
    a module body extending in length from a first end to a second end, laterally in width from a first side edge to a second side edge, and in thickness from a top to a bottom;
    a first set of hinge elements having rod holes aligned along the first end and a second set of hinge elements having rod holes aligned along the second end;
    a socket formed in the module body laterally inward of the first side edge;
    a rod-retention plug positioned in the socket to occlude the rod holes aligned along the first end of the module body;
    a sideguard standing up from the top of the module body at the first side edge and having locking structure that engages the rod-retention plug to lock the rod-retention plug in position in the socket.

2. The conveyor belt edge module as claimed in claim 1 wherein the module body includes an axle in the socket and wherein the rod-retention plug includes a bore receiving the axle.

3. The conveyor belt edge module as claimed in claim 1 wherein the rod-retention plug includes an outer side and a locking stub extending outward of the outer side and wherein the locking structure of the sideguard engages the locking stub to lock the rod-retention plug in place in the socket.

4. The conveyor belt edge module as claimed in claim 1 wherein:
    the sideguard includes:
        a base;
        a plate standing up from the base;
        two legs extending down from the base, each having a tab or a tab recess; and
    the module body includes:
        two slots between the top and the bottom of the module body at the first side edge receiving the two legs, each slot having a complementary tab recess or a complementary tab;
    the tab recesses mate with the complementary tabs to hold the sideguard in place.

5. The conveyor belt edge module as claimed in claim 4 wherein the module body includes a shelf recessed below the top at the first side edge and wherein the base of the sideguard sits on the shelf.

6. The conveyor belt edge module as claimed in claim 4 wherein one of the legs includes a hook forming the locking structure that engages the rod-retention plug to lock the rod-retention plug in position in the socket.

7. The conveyor belt edge module as claimed in claim 1 wherein the rod-retention plug includes a main body and a stub extending outward of the main body into engagement with the locking structure of the sideguard to lock the rod-retention plug in position in the socket.

8. A conveyor belt edge module comprising:
    a module body extending in length from a first end to a second end, laterally in width from a first side edge to a second side edge, and in thickness from a top to a bottom;
    a first set of hinge elements having rod holes aligned along the first end and a second set of hinge elements having rod holes aligned along the second end;
    a laterally elongated hinge element at the first end and the first side edge having a rod hole aligned with the rod holes of the first set of hinge elements;
    a socket opening onto the bottom of the module body and dividing the rod hole of the laterally enlarged hinge element into an outer rod-hole portion that opens onto the first side edge and an inner rod-hole portion;
    an axle and socket locking structure in the socket;
    a rod-retention plug mounted in the socket and having plug locking structure and an axial bore receiving the axle;
    wherein the rod-retention plug is rotatable from an unlocked position in which the plug locking structure and the socket locking structure are disengaged to a locked position in which the plug locking structure and the socket locking structure are engaged.

9. The conveyor belt edge module as claimed in claim 8 wherein the socket is bounded by a socket wall and a ceiling opposite the bottom of the module body and wherein the socket locking structure includes a socket stub extending into the socket from the socket wall and wherein the plug locking structure includes a plug stub extending outward into axial compressive contact with the socket stub to maintain the rod-retention plug in the locked position.

10. The conveyor belt edge module as claimed in claim 9 wherein the module body includes a hole through the ceiling axially spaced from the socket stub and wherein the plug stub includes an axially extending nub received in the hole when the rod-retention plug is in the locked position.

11. The conveyor belt edge module as claimed in claim 8 wherein the socket is bounded by a socket wall and a ceiling opposite the bottom of the module body and wherein the plug locking structure includes a plug stub extending outward into the socket and wherein the module body includes a stop extending into the socket from the socket wall and wherein the stop contacts the plug stub to define a limit of rotation of the rod-retention plug in the unlocked position.

12. The conveyor belt edge module as claimed in claim 8 wherein the rod-retention plug includes a generally circular cylindrical main body having an outer side with a flat, an axial groove, and circumferentially spaced first and second axial ribs.

13. The conveyor belt edge module as claimed in claim 12 wherein the rod-retention plug includes an arm extending from a free end to a fixed end connected to the first axial ridge by a living hinge that allows the arm to be flexed toward and away from the flat on the outer side of the main body.

14. The conveyor belt edge module as claimed in claim 13 wherein the arm includes a blocking face at the free end that occludes the inner rod-hole portion when the arm is in an unflexed state away from the flat and wherein the blocking face does not occlude the inner rod-hole portion when the arm is in a flexed state against the flat.

15. The conveyor belt edge module as claimed in claim 8 comprising a sideguard attached to the top of the module body at the first side edge and having sideguard locking structure engaging the plug locking structure to lock the rod-retention plug in the locked position.

16. The conveyor belt edge module as claimed in claim 15 wherein:
the sideguard includes:
a base;
a plate standing up from the base;
two legs extending down from the base; and
the module body includes:
two slots between the top and the bottom of the module body at the first side edge receiving the two legs;
wherein the two legs are snap-fitted into the two slots to hold the sideguard to the module body.

17. The conveyor belt edge module as claimed in claim 16 wherein one of the legs includes a hook forming sideguard locking structure that engages the plug locking structure to lock the rod-retention plug in the locked position in the socket.

18. A modular conveyor belt comprising:
a plurality of the conveyor belt edge modules as claimed in claim 8 arranged first end to second end with at least some of hinge elements of the first set interleaved with at least some of the second hinge elements of the second set to form laterally aligned passageways through the interleaved hinge elements;
hinge rods received in the laterally aligned passageways to connect consecutive conveyor belt edge modules at hinge joints;
wherein the rod-retention plugs in the locked position occlude the aligned passageways to block the hinge rods from exiting the passageways through the conveyor belt edge modules while the modular conveyor belt is running.

19. A modular conveyor belt as claimed in claim 18 comprising the conveyor belt edge modules arranged along left and right sides of the conveyor belt.

20. A modular conveyor belt as claimed in claim 18 wherein consecutive conveyor belt edge modules are of different widths.

* * * * *